3,220,928
ENZYMATIC CLEANING PROCESS
Mortimer Wilkes Brenner, Scarsdale, N.Y., assignor to Schwarz Laboratories, Inc., Mount Vernon, N.Y.
Filed July 6, 1962, Ser. No. 207,891
2 Claims. (Cl. 195—2)

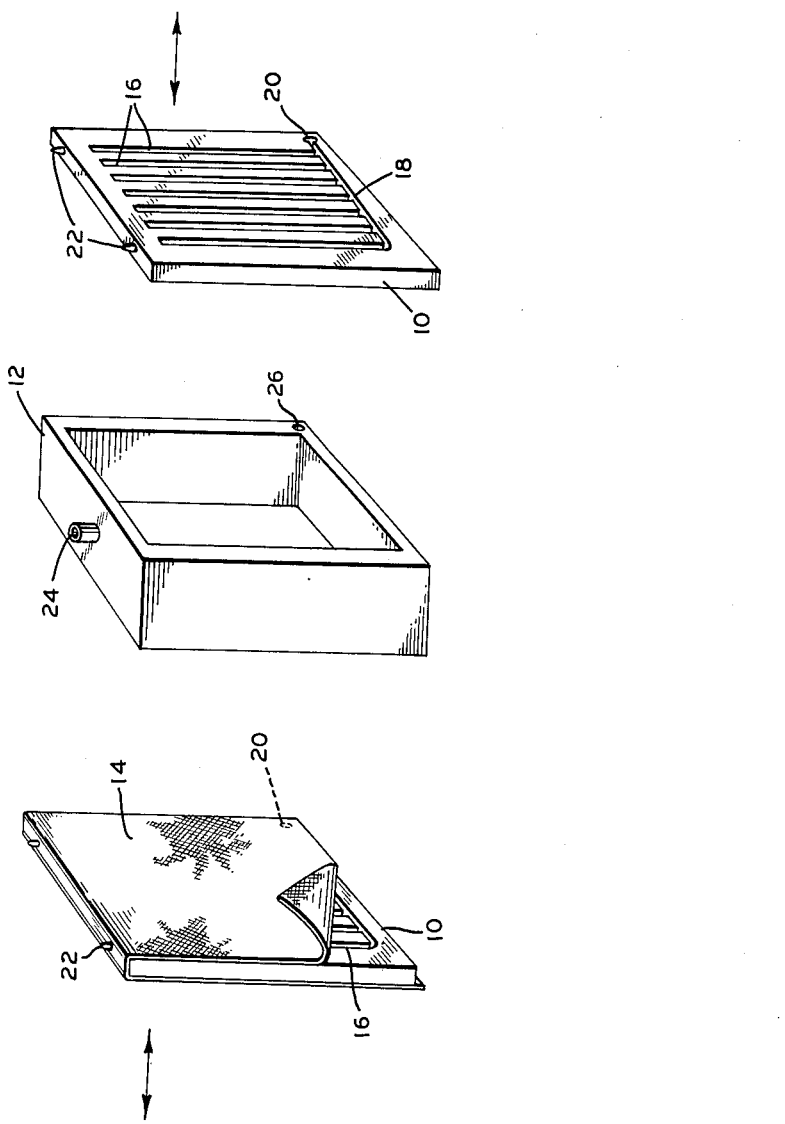
INVENTOR.
MORTIMER WILKES BRENNER
BY
Blair and Buckles
ATTORNEYS.

The present invention relates to processes in the art of filtering, and in particular to processes for permitting rapid and effective removal of organic residues from filter cloths by enzymic action.

It is generally known in the art to separate solids from liquid by the use of filtering apparatus utilizing a filter cloth or membrane which permits the liquid to pass, while retaining the suspended solids. After a period of time, the accumulated solids will slow down the filtering action sufficiently to require that the filter be cleaned. Typical practice in the early prior art was to mechanically remove as much of the solids from the filter cloth as possible, then remove the cloths and wash them after each filter cycle. Recently "high release" filter cloths came into use, which more effectively released the accumulated solids and could be reused several times without removal for washing, perhaps with an occasional hosing down. However, the pores of the cloth eventually clogged, and a film built up on the individual fibers as a result of the continued reuse without cleaning, which reduced the high release properties of the cloth so that eventually the cloths required cleaning.

The cloths then were typically cleaned with hot caustic soda, either by filling the filter with a hot caustic solution after mechanically removing most of the organic solids, or by removing the filter cloths from the filter for separate treatment with hot caustic. The strong solutions of caustic soda thus used in cleaning the filter cloths were dangerous to handle and required careful safety precautions. In addition, in the food industry, this method of cleaning required careful rinsing to remove the last traces of caustic soda before the cloth could be reused, and the spent caustic soda washing solution itself presented disposal problems.

Accordingly, it is an object of the present invention to provide an improved method for cleaning filter cloths.

A further object is to provide improved cleaning methods of the above character which are safe and economical, and which are suited to automatic operation.

A further object is to provide a cleaning method of the above character which is particularly advantageous in the food industry.

A further object is to provide an improved cleaning method of the above character which may reduce or entirely eliminate the need for rinsing cloths after cleaning.

Other objects of the invention will in part be obvious and will in part appear hereinafter.

The invention accordingly comprises the several steps and the relation of one or more of such steps with respect to each of the others thereof, which will be exemplified in the method hereinafter disclosed, and the scope of the invention will be indicated in the claims.

For a more complete understanding of the nature and objects of the invention, reference should be had to the following detailed description taken in connection with the accompanying drawing, which is a perspective view of a portion of a conventional plate and frame filter press such as used in the brewing industry.

As shown in the drawing, such a filter press comprises generally an arrangement of alternate plates 10 and frames 12. The plates 10 are covered by porous members 14, such as cotton cloth, plastic cloth, felt, paper, or other materials suitable to the purpose. As is illustrated, this filter cloth 14 is usually draped over the entire plate so that one continuous cloth runs from the bottom of one side of the plate over the top and down the other side. Both the large surfaces of the plate are grooved or corrugated as shown at 16 so as to provide channels for the filtrate which is passed through the filter cloth. As illustrated, the channels 16 may communicate with a common channel 18, which in turn communicates with an aperture 20 through one corner of plate 10. Suitable means may be provided for securing filter cloth 14 to plate 10, such as the illustrated pair of pins 22 attached to plate 10 and protruding upwardly through filter cloth 14, for a purpose to be described.

Frame 12 generally resembles a shallow open box, the two large opposed sides of which are closed by cloth-covered frames 10. The alternating plates 10 and frames 12 are then pressed together by a suitable mechanism (not illustrated). A suitable pipe or other means 24 is provided through one of the walls of frame 12, to permit introduction of the turbid liquid to be filtered. Frame 12 may further be provided with asuitable aperture 26 through one edge, aligned with apertures 20 in plates 10, to provide a passageway for conducting the filtrate to one end of the filter press assembly.

This alternating arrangement of plates and frames provides for a filter cloth-covered plate on each said of a single frame. The frame thus serves as a chamber in which the collected solids to be removed from a liqiud are retained, the liquid being introduced through aperture 24 in frame 12, passing through filter cloths 14 on either side of the chamber, and being collected by channels 16 and 18 for feeding through aligned apertures 20 and 26 to a suitable receptacle. Usually at the end of a filtering operation, the collected solids have been subjected to some pressure and are formed in a compact, wet mass, referred to as a filter cake.

In order to prepare the filter for further use, the plates and frames are separated, either manually or by a mechanism similar to that disclosed in United States patent application Serial Number 113,317, filed May 29, 1961 and now U.S. Patent 3,153,630 by Donald S. Green for Means for Sequentially Separating Adjacent Elements From Each Other, and assigned to the assignee of the present application. The particular mechanism for separating the plates and frames forms no part of the present invention.

When the plates and frames are separated, the filter cake will fall out of frames 12. Pins 22 on the top of plates 10 retain filter cloths 14 in place on plates 10, preventing cloths 14 from sliding off plates 10 if an unbalanced drag is created when one side of the cloth releases the adhering filter cake momentarily ahead of the other side. Other equivalent means could be used for retaining cloth 14 in place if desired.

As noted above, the pores of the filter cloths tend to become clogged, or the surfaces of the cloth eventually become sufficiently filmed so as to substantially reduce the ability of the cake to drop free from the cloth, at which time it becomes necessary to clean the cloth. According to the present invention, the cloth is cleaned by treating it with an aqueous solution of enzymes selected to remove the film and/or particles clogging the pores in the filter cloth while not substantially attacking the cloth itself.

Where the product being filtered is a foodstuff, as in the brewing industry, such cleaning may be preferably performed by using an aqueous solution of a broad spectrum enzyme preparation, such as that derived from *Bacillus subtilis* or *Aspergillus oryzae,* or similar preparations acceptable for food purposes. Such enzyme solutions usually should contain amylolytic and proteolytic activity but preferably also contain cellulase, hemicellulase, lipase, carboxylase and other types of enzymic activity, depending on the composition of the solids to be removed from the filter cloth.

The concentration of enzymes employed in the cleaning solution may vary widely, but it has been found that commercially practicable preparations of this type may be used in solutions containing from two to two thousand parts per million (p.p.m.). The temperature of the solution should be high enough to obtain rapid cleaning action, but not so high as to denature the enzymes. A typical optimum range of temperatures is between 130° F. and 176° F., although lower temperatures merely require longer times for the same degree of cleaning and slightly higher temperatures become less efficient due to denaturization of the enzymes. Such enzymic solutions provide a cleaning action, particularly as regards starch residues, which is equalled only by considerably hotter caustic solutions.

Using a particular combination of enzymes for cleaning mash filter presses with the cloths in place, a concentration of 20 parts per million of enzyme in aqueous solution was used, heated to approximately 150° to 170° F. Higher temperatures with this particular combination of enzymes would have caused denaturation of the enzyme, with consequent loss of cleaning rate. The solution was recirculated through the filter press for about 30 minutes, whereupon the filter was drained and flushed with hot water. It has been found that the above treatment usually need not be repeated more often than every 25 to 30 brews, when using high release filter cloths in the brewing industry.

When the filter cloths are removed from the press for separate cleaning rather than in-place cleaning as described above, the cloths may be rinsed as usual for removal of the spent grain particles, and then washed in the enzyme solution. In this case, the temperature and concentration may be substantially the same as described above for in-place cleaning.

Although the concentration of enzymes of between 2 and 2,000 p.p.m. as above described is the preferred range for economic reasons, higher concentrations may be used to further speed the cleaning rate if desired, while lower concentrations would give a correspondingly slower cleaning rate.

The above-disclosed method for enzymic cleaning is particularly advantageous in the food industry, since proper selection of enzymes will provide rapid and efficient cleaning action, and usually extensive rinsing to remove the enzymic solution after cleaning is unnecessary, in contrast to that required when caustic solutions are used. As noted above, the enzymic solutions are substantially safer to use than caustic, and present no disposal problems.

It will be thus be seen that the objects set forth above, among those made apparent from the preceding description, are efficiently attained and, since certain changes may be made in carrying out the above method without departing from the scope of the invention, it is intended that all matter contained in the above description shall be interpreted as illustrative and not in a limiting sense. All references in the specification or claims to relative proportions, parts per million, or the like, refer to proportions by weight where otherwise unspecified.

It is also to be understood that the following claims are intended to cover all of the generic and specific features of the invention which, as a matter of language, might be said to fall therebetween.

Having described my invention, what I claim as new and desire to secure by Letters Patent is:

1. The method of cleaning brewery filter presses and cloths in situ comprising the steps of
    (A) releasing the filter press,
    (B) removing the accomulated cake of filtered particles from the filter press and cloths,
    (C) reclosing the filter press with the same cloths in place,
    (D) passing an aqueous cleaning solution through the filter press,
        (1) said cleaning solution containing 2–2000 parts per million of enzymes
            (a) having amylolytic and
            (b) proteolytic activity,
    (E) and then rinsing the filter press and cloths to remove the cleaning solution.

2. The method defined in claim 1 wherein the enzymes are derived from the group consisting of *Bacillus subtilis* and *Aspergillis oryzae*.

References Cited by the Examiner
UNITED STATES PATENTS

| | | | |
|---|---|---|---|
| 1,505,534 | 8/1924 | Boidin et al. | 195—2 |
| 1,826,467 | 10/1931 | Harteneck | 195—2 |
| 2,388,284 | 11/1945 | Ratner | 260—412.6 |
| 2,558,869 | 7/1951 | McColm | 260—412 |
| 2,607,359 | 8/1962 | Oesting | 195—7 |

OTHER REFERENCES

Tappel: Food Industries, vol. 22, No. 8, pp. 87 and 88, August 1950.

Whitlin, Science, vol. 98, No. 2537, page 160, Aug. 16, 1943.

A. LOUIS MONACELL, *Primary Examiner.*

ABRAHAM H. WINKELSTEIN, *Examiner.*

UNITED STATES PATENT OFFICE
CERTIFICATE OF CORRECTION

Patent No. 3,220,928 November 30, 1965

Mortimer Wilkes Brenner

It is hereby certified that error appears in the above numbered patent requiring correction and that the said Letters Patent should read as corrected below.

Column 2, line 19, for "asuitable" read -- a suitable --; line 24, for "said" read -- side --; column 4, line 20, for "accomulated" read -- accummulated --.

Signed and sealed this 20th day of September 1966.

(SEAL)
Attest:

ERNEST W. SWIDER
Attesting Officer

EDWARD J. BRENNER
Commissioner of Patents